(12) United States Patent
Tajika et al.

(10) Patent No.: US 6,382,026 B1
(45) Date of Patent: May 7, 2002

(54) ACCELERATION SENSOR AND ACCELERATION APPARATUS USING ACCELERATION SENSOR

(75) Inventors: Hirofumi Tajika; Kazunari Nishihara; Koji Nomura, all of Osaka; Motoyuki Taji, Kyoto; Yoshihiro Tomita, Osaka, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/463,140
(22) PCT Filed: May 17, 1999
(86) PCT No.: PCT/JP99/02559
   § 371 Date: Apr. 12, 2000
   § 102(e) Date: Apr. 12, 2000
(87) PCT Pub. No.: WO99/60413
   PCT Pub. Date: Nov. 25, 1999

(30) Foreign Application Priority Data

| May 19, 1998 | (JP) | 10-136375 |
| Aug. 28, 1998 | (JP) | 10-242707 |
| Sep. 22, 1998 | (JP) | 10-267887 |

(51) Int. Cl.[7] ............................................. G01P 15/09
(52) U.S. Cl. ................... 73/514.34; 310/329; 310/331
(58) Field of Search ........................... 73/514.34, 651; 310/329, 331, 332, 367

(56) References Cited

U.S. PATENT DOCUMENTS

| 4,494,409 A | * | 1/1985 | Kondo et al. ............ 73/651 |
| 5,452,612 A |   | 9/1995 | Smith et al. |
| 6,098,460 A | * | 8/2000 | Otsuchi et al. .......... 73/514.34 |

FOREIGN PATENT DOCUMENTS

| JP | 7-244066 | 9/1995 |
| JP | 9-26433 | 1/1997 |
| JP | 9-54111 | 2/1997 |
| JP | 9-243656 | 9/1997 |
| JP | 10-96742 | 4/1998 |

* cited by examiner

Primary Examiner—John E. Chapman
(74) Attorney, Agent, or Firm—Ratner & Prestia

(57) ABSTRACT

An acceleration sensor having a well controlled dispersion in the detection, characteristics and improved detection characteristics in the low frequency detection comprises a first piezoelectric plate (11), a second piezoelectric plate (12) bonded to the first piezoelectric plate (11) by direct bonding, a first external electrode (13) provided on the main surface of the first piezoelectric plate (11) and a second external electrode (14) provided on the main surface of the second piezoelectric plate (12). The first piezoelectric plate (11) and the second piezoelectric plate (12) are bonded together with their polarization axes reversed to each other. Appearance of the acceleration sensor resembles to a letter "L" in the cross section; thickness of the supporting section (15) is greater than that of the rest part (free vibration section).

4 Claims, 19 Drawing Sheets

ACCELERATION SENSOR AND ACCELERATION APPARATUS USING ACCELERATION SENSOR

THIS APPLICATION IS A U.S. NATIONAL PHASE APPLICATION OF PCT INTERNATIONAL APPLICATION PCT/JP99/02559.

TECHNICAL FIELD

The present invention relates to an acceleration sensor of bimorph cell structure and an acceleration device using the acceleration sensor.

BACKGROUND ART

The acceleration sensor, as well as the acceleration device using the acceleration sensor, are used for the purpose of automotive posture control, seismic detection, etc. What is specifically required in the recent application fields is that which is capable of detecting low frequency acceleration with high accuracy and high reliability.

FIG. 22 is a cross sectional view of a conventional acceleration device. An acceleration sensor 5 used in the device is formed of a pair of rectangular piezoelectric, ceramic plates 3, 4 bonded together by an adhesive with respective polarization axes reversed to each other, and external electrodes 6 and 7 provided on respective outer surfaces of the piezoelectric ceramic plates 3, 4. One end of the acceleration sensor 5 is fixed on a protruding section 2 of a board 1 with a conductive adhesive, and the external electrode 6 and a signal outlet cable 10 are connected by means of a wire 8. The acceleration sensor 5 is covered by a cap 9 for protection.

When acceleration is effected, the acceleration sensor 5 vibrates in the direction of thickness and generates electric charges corresponding to the size of displacement. The acceleration is known by detecting the quantity of the electric charge. The detection sensitivity of acceleration is in proportion to the quantity of the electric charge. The sensitivity is proportional to the length of piezoelectric ceramic plate 3,4, from the fixed end to the tip end of vibrating portion, or the length of free vibration section L2. Therefore, the sensitivity may be raised by increasing the length L2. This, however, lowers the resonance frequency; as a result, the highest detectable frequency becomes low. On the other hand, a shorter L2 raises the upper limit of detectable frequency, but it lowers the detection sensitivity.

A conventional acceleration device for the low frequency detection is provided with a field effect transistor and a resistor connected to the acceleration sensor 5, for making the output impedance small. And a low-cut filter is formed by the piezoelectric ceramic plate 3, 4 and the resistor. The cutoff frequency f is determined by the following formula:

$$f = 1/2\, \pi RC$$

where C is capacitance of the piezoelectric ceramic plate 3, 4, and R is resistance value of the resistor. Accordingly, in order to detect the low frequency, the electrostatic capacitance C of the piezoelectric plate 3, 4, or the resistance value R, have to be made larger.

However, the use of a large R resistor easily leads to a noise absorption; as a result, the detection of low frequency acceleration turns out to be difficult. Therefore, it is essential to make the piezoelectric ceramic plate of great capacitance C readily available.

In conventional acceleration devices, because the acceleration sensor 5 has been fixed at one end on the protruding section 2 using a conductive adhesive, it has been difficult to keep the state of fixing, which is relevant to detection characteristics, under strict control, and variations in the length L2 have also been large. This means that there is a wide variance in the detection sensitivity.

One of the objectives of the present invention is to offer an acceleration sensor and an acceleration device that have an improved detection characteristic in the low frequency.

Another objective of the present invention is to offer an acceleration sensor and an acceleration device that have a well-controlled variance in the detection sensitivity.

DISCLOSURE OF THE INVENTION

An acceleration sensor in accordance with the present invention comprises a first piezoelectric plate, a second piezoelectric plate contacting to the first piezoelectric plate, with the polarization axes reversed to each other, thickness of at least one end in the length direction being thicker than that of the rest, a first external electrode provided on the main surface of the first piezoelectric plate, which main surface being a surface opposite to the surface making contact with the second piezoelectric plate, and a second external electrode provided on the main surface of the second piezoelectric plate, which main surface being a surface opposite to the surface making contact with the first piezoelectric plate. A preferred exemplary sensor is that which has a shape of an approximate letter "L", in the cross sectional view along a plane parallel to the length direction of the second piezoelectric plate.

An acceleration device in accordance with the present invention comprises the acceleration sensor of the present invention, a source follower circuit electrically connected with the acceleration sensor, and a stem for mounting the acceleration sensor and the source follower circuit thereon.

With the above described structure, the variance of characteristics is very small because the free vibration section of the biomorph cell and the supporting section, which corresponds to the protruding section of the conventional section, is formed as a single piece member. Furthermore, it is not easily breakable even when the thickness goes thinner for increasing the electrostatic capacitance. This means that the electrostatic capacitance can be increased easily for the detection of acceleration in the lower frequency.

BEST MODE FOR CARRYING OUT THE INVENTION

Exemplary embodiments of the present invention will be described in the following with reference to the drawings.

EMBODIMENT 1

Figure 1A:
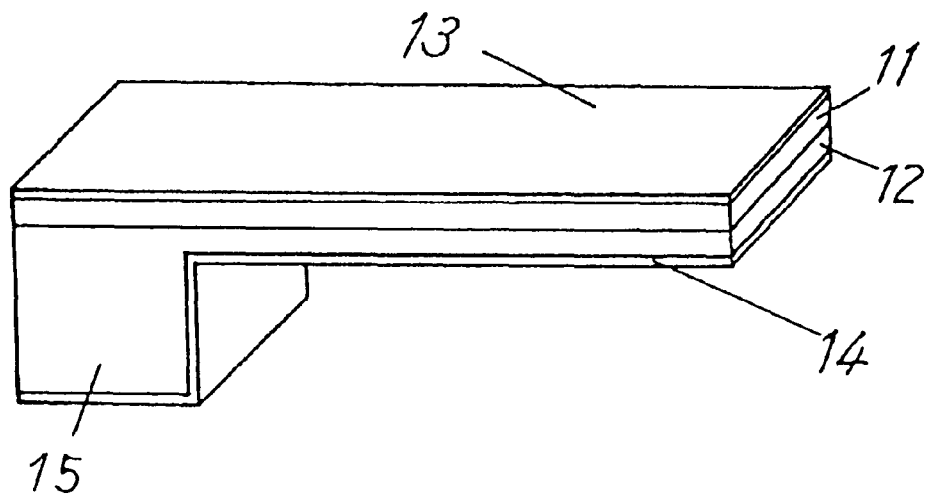
FIG. 1(a) is a perspective view of an acceleration sensor in accordance with a first exemplary embodiment of the present invention.
Figure 1B:
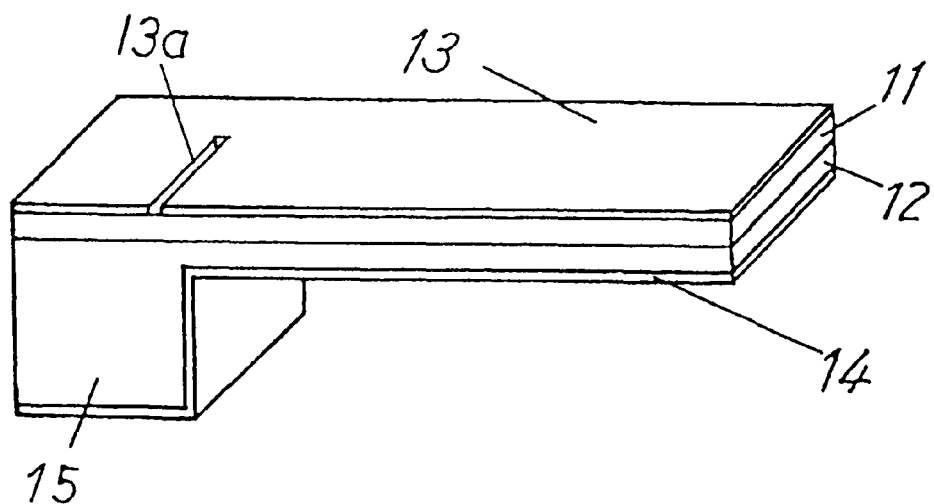
FIG. 1(b) is a perspective view of the acceleration sensor of FIG. 1(a) having a notch in the external electrode.

An acceleration sensor of FIG. 1(a) has a bimorph cell structure, in which a rectangular first piezoelectric plate 11 and a second piezoelectric plate 12 shaped in the form of an approximate letter "L" in the cross section are glued together by a direct bonding method. The first and the second piezoelectric plates 11, 12 are made of single crystal $LiNbO_3$, $LiTaO_3$ or other piezoelectric material, with respective polarization axes reversed to each other at the bonding surface (polarization reversal boundary). Depending on needs, these piezoelectric plates may be bonded together so that respective polarization axes are in parallel to each other at the bonding surface. The acceleration sensor is provided in the shaped of an approximate letter "L", by first bonding the first and the second piezoelectric plates 11, 12 together and then grinding part of the second piezoelectric plate 12 off in order to form a supporting section 15. A first and a second external electrodes 13, 14 are provided respectively on the main surfaces of the first and the second piezoelectric plates 11, 12. Direction of the highest detection sensitivity with the acceleration sensor is the direction of thickness of the first and the second piezoelectric plates 11, 12.

The above described structure, because the piezoelectric plates are bonded together by a direct bonding method, has a high mechanical strength, and also has a high heat resisting property. Furthermore, because the length of the free vibration section can be determined precisely by a grinding process, also because the free vibration section and the supporting section 15 have been formed as a single piece member, variances of the characteristics have been controlled to be very small. Still further, because the supporting section 15 and the first and second piezoelectric plates 11, 12 have been provided as a single piece member, the acceleration sensor is not easily breakable even when it is made thinner for a greater electrostatic capacitance. Namely, the electrostatic capacitance can be increased easily for the detection of an acceleration in lower frequency.

It is preferred that the supporting section 15 has a thickness not less than 4 times that of the free vibration section. Under the above described structure, binding stiffness of the supporting section 15 is very much higher than that of the free vibration section. As a result, variation of the characteristics caused by dispersion in the fixing of supporting section 15 can be well suppressed.

For the purpose of adjusting the detection quantity, etc. for an acceleration, the first external electrode 13 may be provided at a place above the supporting section 15 with a notch 13a in a direction parallel with the direction of width. This will contribute to put the variance in detection sensitivity under control.

Figure 2:
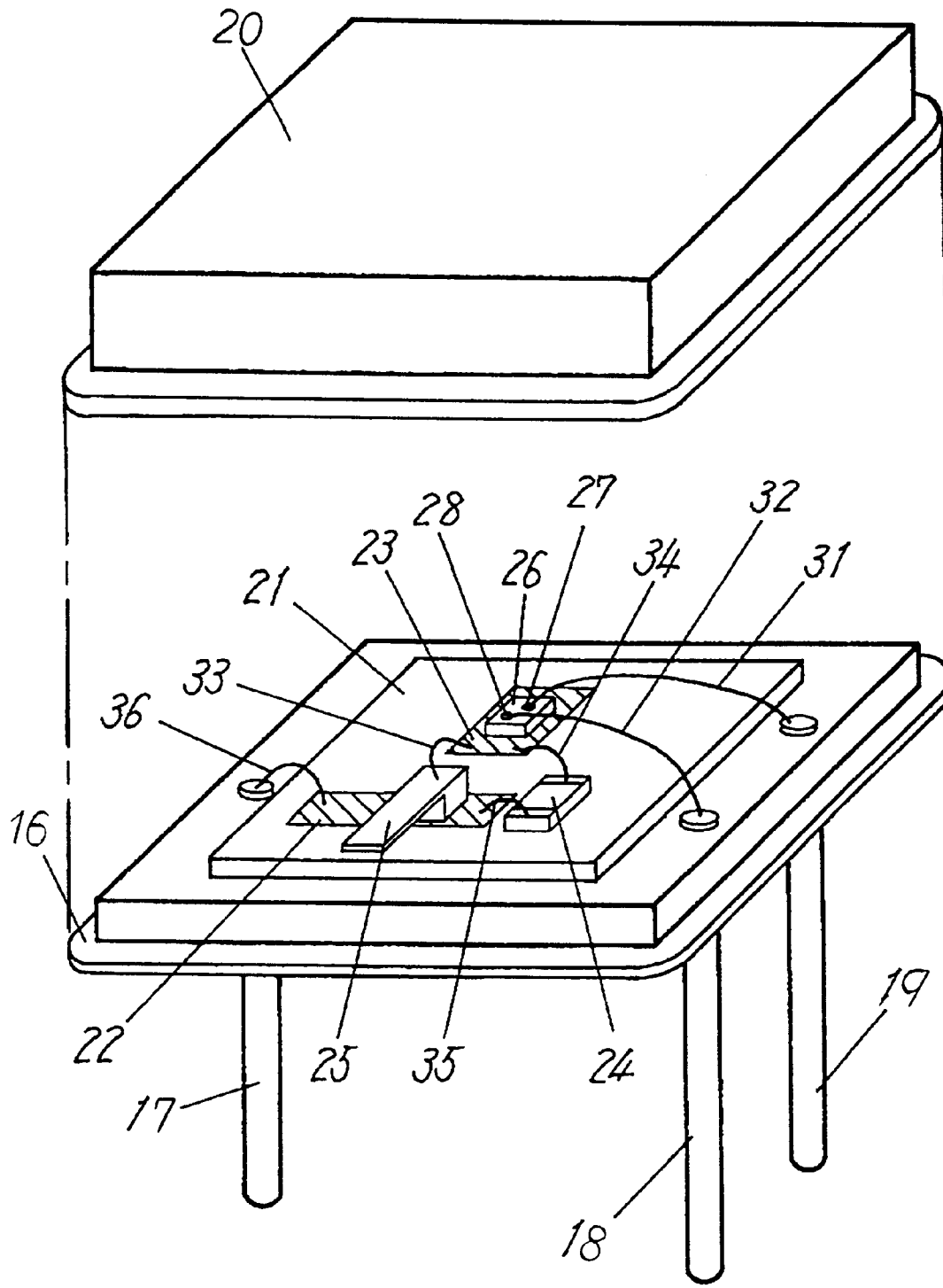
FIG. 2 is an exploded perspective view an acceleration device incorporating the acceleration sensor of FIG. 1(a) is used.
Figure 3:
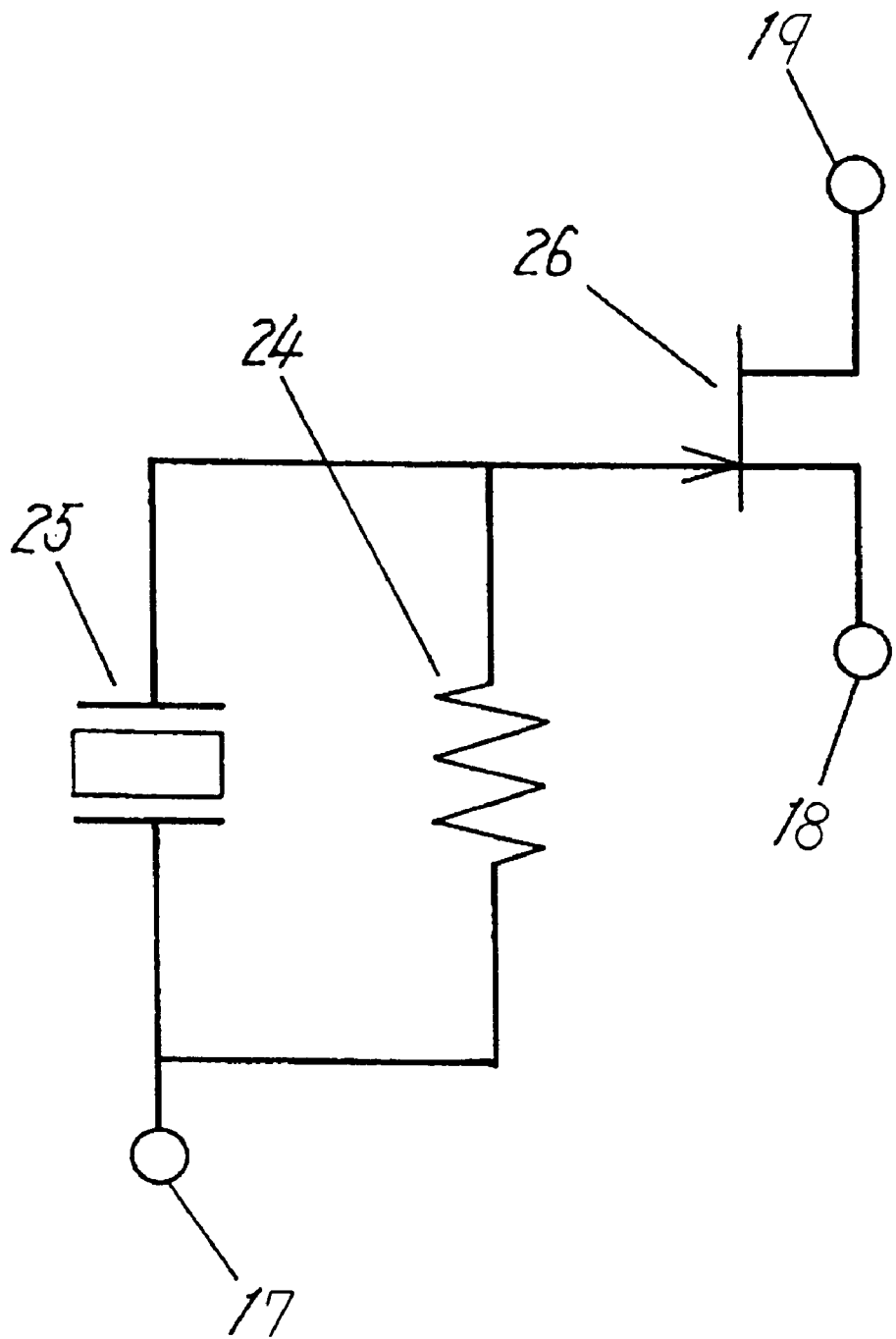
FIG. 3 is a circuit diagram of the acceleration device.

Now in the following, an acceleration device using the acceleration sensor is described with reference to FIG. 2 and FIG. 3.

In a stem 16, there are a first, a second and a third connection terminals 17, 18, 19 protruding downward from the up, and a substrate 21 provided on the upper surface. Provided on the substrate 21 are a first circuit pattern 22, a second circuit pattern 23 and a resistor 24, e.g. a rectangular chip resistor, with a resin layer (not shown) interposed. The acceleration sensor 25 shaped approximately to a letter "L", as described earlier, is fixed on the upper surface of the first circuit pattern 22 with a conductive resin layer (not shown) interposed. A transistor 26, e.g. a field effect transistor, is mounted on the upper surface of the second circuit pattern 23 with a conductive resin layer (not shown) interposed.

Source electrode 27 of the transistor 26 is electrically connected with the third connection terminal 19 via a first wire 31, and drain electrode 28 is electrically connected with the second connection terminal 18 via a second wire 32. The second circuit pattern 23 is electrically connected with the first external electrode 13 of the acceleration sensor 25 via a third wire 33, and with one of the side electrodes of the resistor 24 via a fourth wire 34. The other side electrode of the resistor 24 is electrically connected with the first circuit pattern 22 via a fifth wire 35. The first circuit pattern 22 is electrically connected also with the first connection terminal 17 via a sixth wire 36. Thus, the resistor 24, the acceleration sensor 25 and the transistor 26 constitute a sensor unit, together with the first and the second circuit patterns 22, 23 electrically connected therewith. A cap 20 is provided on the stem 16 to cover the sensor unit.

The present acceleration device incorporating the above described acceleration sensor has only a very small variance in the characteristics, and is capable of detecting low frequency acceleration. Because the sensor unit has been covered with cap 20, a resistor that has a greater resistance value than in a conventional device can be used. As a result, an acceleration of lower frequency can be detected.

The connection wires, the third wire 33 connected to the first external electrode 13 of acceleration sensor 25, among other wires, should preferably be soft wires from the view point of preventing possible adverse effects of wire vibration onto the acceleration sensor 25.

EMBODIMENT 2

Figure 4:
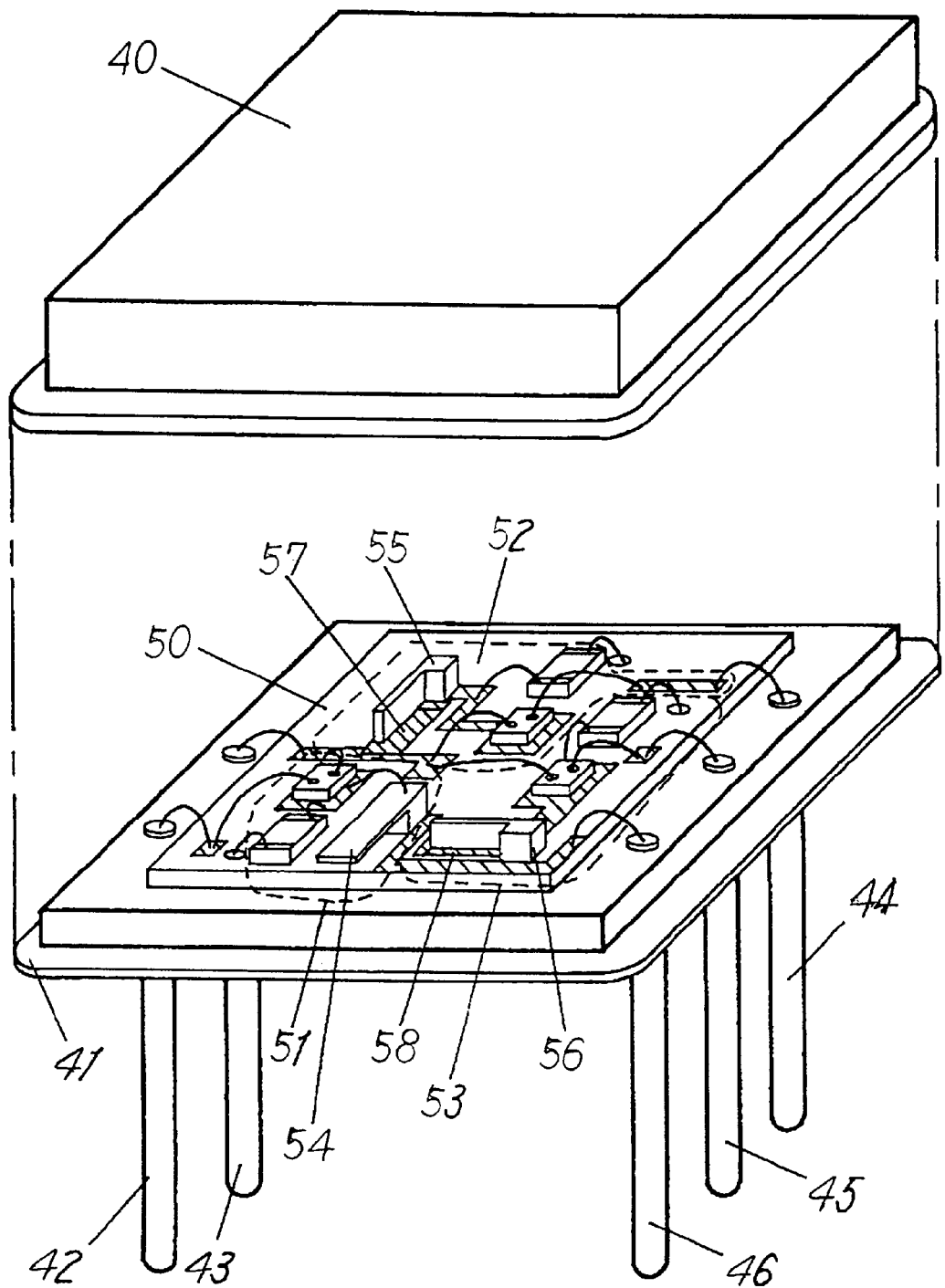
FIG. 4 is an exploded perspective view of an acceleration device in accordance with a second exemplary embodiment of the present invention.

As shown in FIG. 4, there are a first, a second, a third, a fourth and a fifth connection terminals 42, 43, 44, 45, 46 protruding downward from the up in a stem 41, and a substrate 50 is provided on the upper surface of the stem 41. Provided on the substrate 50 are a first, a second and a third acceleration sensor units 51, 52, 53, disposed at certain specific places, each of the units having at least a resistor, an acceleration sensor, a transistor and a circuit pattern. The structure of the acceleration sensors remains the same as in embodiment 1.

The first acceleration sensor 54 of the first sensor unit 51 is disposed with the protrusion of second piezoelectric plate down. Direction of the highest detection sensitivity of the first sensor unit 51 is that which is perpendicular to the upper and bottom surfaces of substrate 50.

The second acceleration sensor 55 of the second sensor unit 52 is fixed at the supporting section on the substrate with the side face in parallel with the substrate 50. In order to prevent the side face of the long arm section of second acceleration sensor 55 from making contact with the substrate 50, a first hollow 57 is provided in the substrate 50. Direction of the highest detection sensitivity of the second sensor unit 52 is that which crosses to that of the first sensor unit 51 at right angles.

The third acceleration sensor 56 of the third sensor unit 53 is fixed, in the same manner as in the second acceleration sensor 55, with the side face in parallel to the substrate 50, and a second hollow 58 is provided in the substrate 50 in order to prevent the long arm section from making contact with the substrate 50. The third acceleration sensor 56, however, is disposed so that the direction of the highest detection sensitivity crosses to that of the second acceleration sensor 55 at right angles.

The first sensor unit 51 is electrically connected with the first connection terminal 42, the second connection terminal 43 and the second sensor unit 52 by wires. The second sensor unit 52 is electrically connected with the second connection terminal 43, the first sensor unit 51 and the third connection terminal 44 by wires. The third sensor unit 53 is electrically connected with the fourth connection terminal 45, the fifth connection terminal 46 and the first sensor unit 51 by wires.

The first, the second and the third sensor units 51, 52, 53 have been covered by a cap 40 for protection.

An acceleration device of the above structure can independently detect each of the accelerations in three orthogonal axes. Although in the present embodiment 2 three sensor units have been provided, two sensor units may be sufficient if the required number of acceleration signals is two.

EMBODIMENT 3

Figure 5:
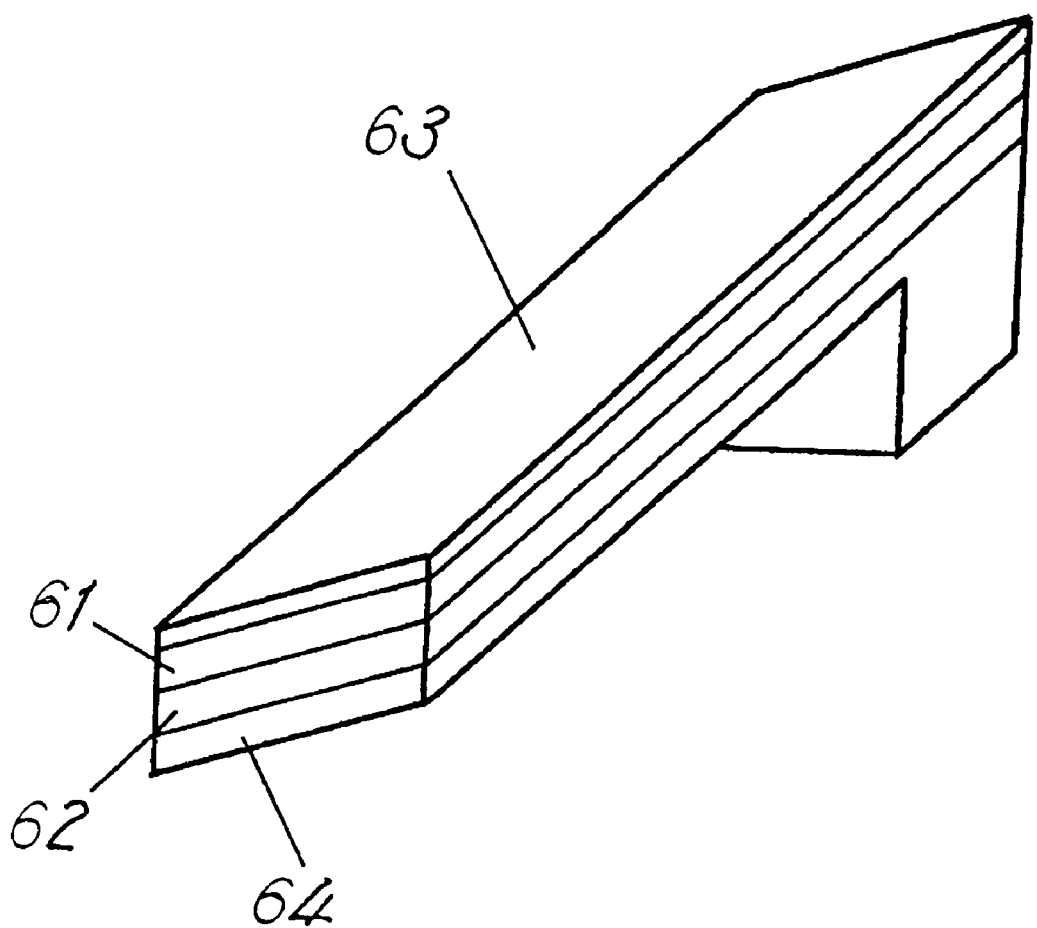
FIG. 5 is a perspective view of an acceleration sensor in accordance with a third exemplary embodiment of the present invention.

An acceleration sensor of FIG. 5 is different from that of embodiment 1 in that the bonding plane between a first piezoelectric plate 61 and a second piezoelectric plate 62 is slanting, and a first and a second external electrodes 63, 64 are provided respectively on the slanting main surfaces. The other structural aspects, including that it has been provided with a supporting section 65, remain the same as those of embodiment 1. So, detailed description of the present sensor is omitted. If angle of the slant bonding plane between the piezoelectric plates 61 and 62, is approximately 45 degrees, then the direction of the highest detection sensitivity also turns out to be approximately 45 degrees. The acceleration sensor having a slant angle of approximately 45 degrees makes it possible to detect accelerations in three orthogonal axes with only two acceleration sensors. Thus the number of constituent components may be decreased.

An acceleration device incorporating the acceleration sensor of the slanting plane is described with reference to FIG. 6.

On a stem 65, there are a first, a second, a third and a fourth connection terminals 66, 67, 68, 69 protruding downward from the stem, and a substrate 70 provided on the upper surface. Provided on the substrate 70 are a first and a second sensor units 71 and 72 located at certain specific places, each sensor unit having at least a resistor, an acceleration sensor, a transistor and a circuit pattern. The first acceleration sensor 73 mounted in the first sensor unit 71 is that which has the above described slanting plane, whereas the second acceleration sensor 74 mounted in the second sensor unit 72 is that which is the same as that of embodiment 1. The second acceleration sensor 74 is disposed so that direction of the highest detection sensitivity of the second sensor unit 72 coincides with a direction at which the highest detection sensitivity turns out to be nil.

The second sensor unit 72 is electrically connected with the second, the third and the fourth connection terminals 67, 68, 69, and the first sensor unit 71. The first sensor unit 71 is electrically connected with the first connection terminal 66, the fourth connection terminal 69 and the second sensor unit 72.

The first and the second sensor units 71, 72 have been covered by a cap 60 fixed on the stem 65.

An acceleration device incorporating an acceleration sensor having the slanting plane and an acceleration sensor without the slanting plane together so that the nil sensitivity direction is orthogonally crossed is capable of detecting accelerations in the three orthogonal axes using only two acceleration sensors. In a practical exemplary application, an earthquake can be accurately detected by disposing the direction of the highest detection sensitivity of the first acceleration sensor to coincide with the direction of the lengthwise wave of the earthquake.

EMBODIMENT 4

Figure 6:
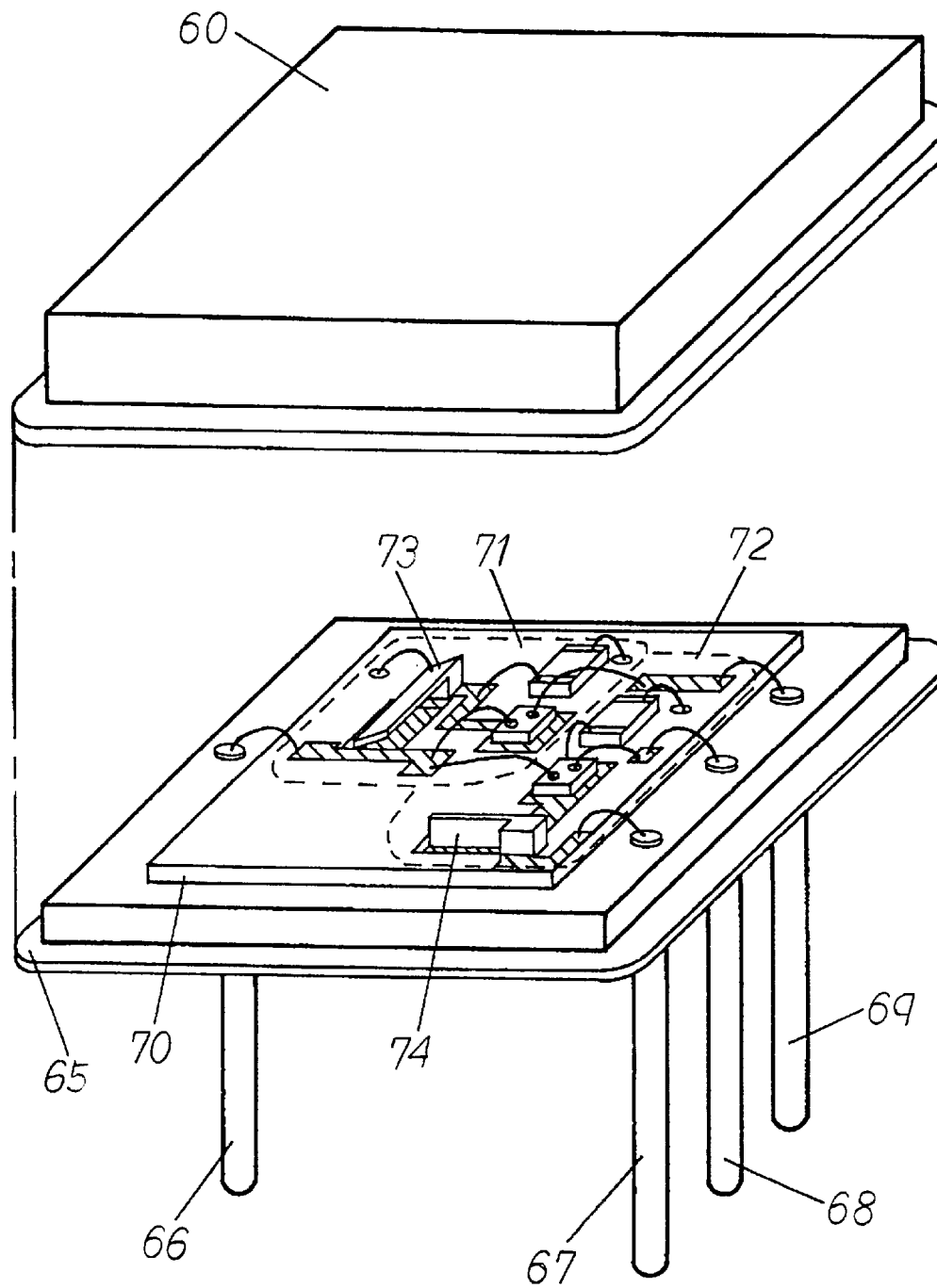
FIG. 6 is an exploded perspective view of an acceleration device incorporating the acceleration sensor of FIG. 5.
Figure 7:
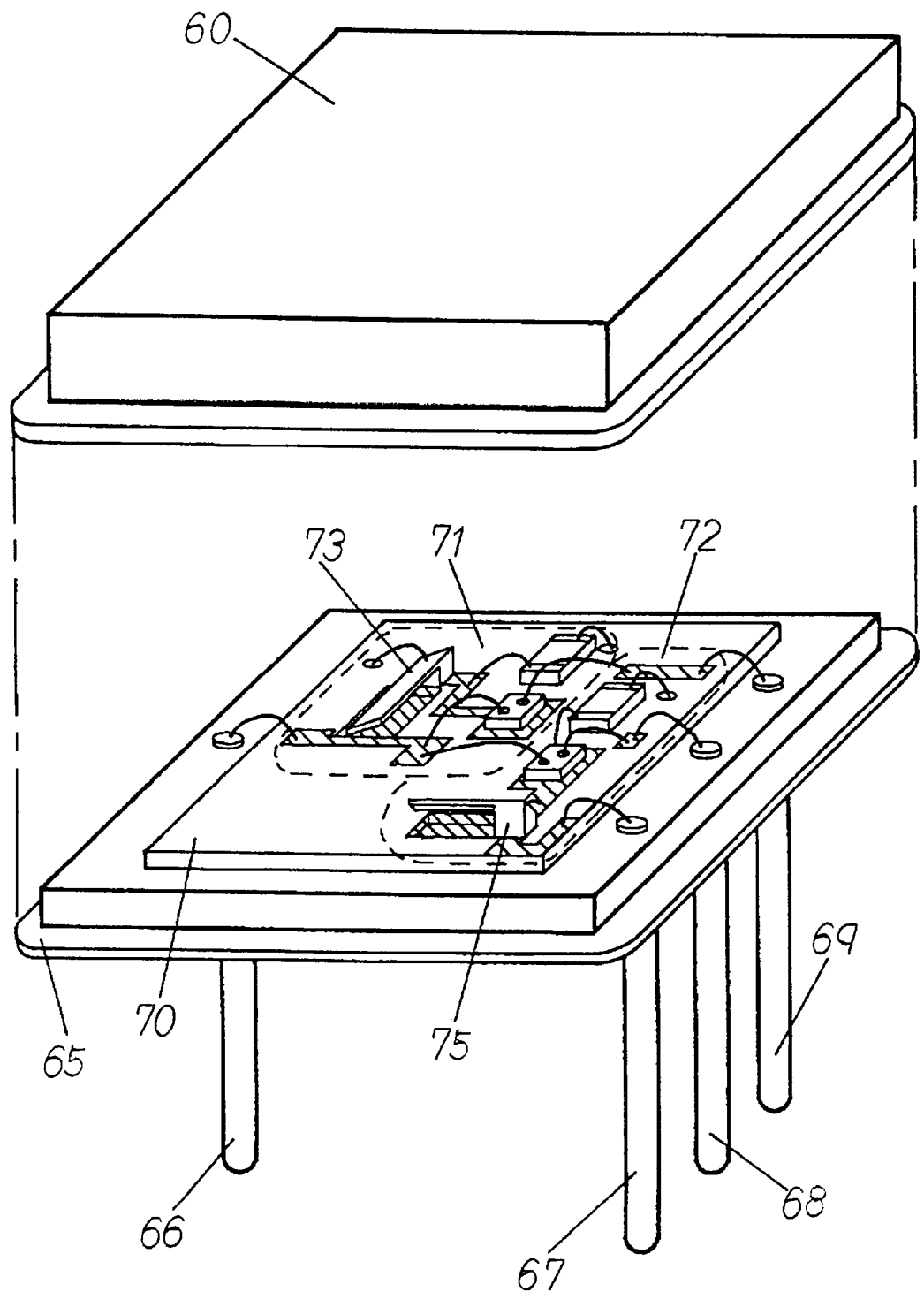
FIG. 7 is an exploded perspective view of an acceleration device in accordance with a fourth exemplary embodiment of the present invention.

An acceleration device of FIG. 7 is identical to that of FIG. 6, except that an acceleration sensor that has the slanting plane has been used for a second acceleration sensor 75, in place of the second acceleration sensor 74 of FIG. 6. The structures other than the acceleration sensor 75 remain the same as those of the acceleration device of FIG. 6. Integrated use of the slanting plane accelerations sensors 73 and 75 in an arrangement so that their respective directions of highest detection sensitivity cross at right angles to each other enables detection of the accelerations in three orthogonal axes, or the accelerations in three orthogonal axes and the direction, with only two acceleration sensors.

EMBODIMENT 5

Figure 8:
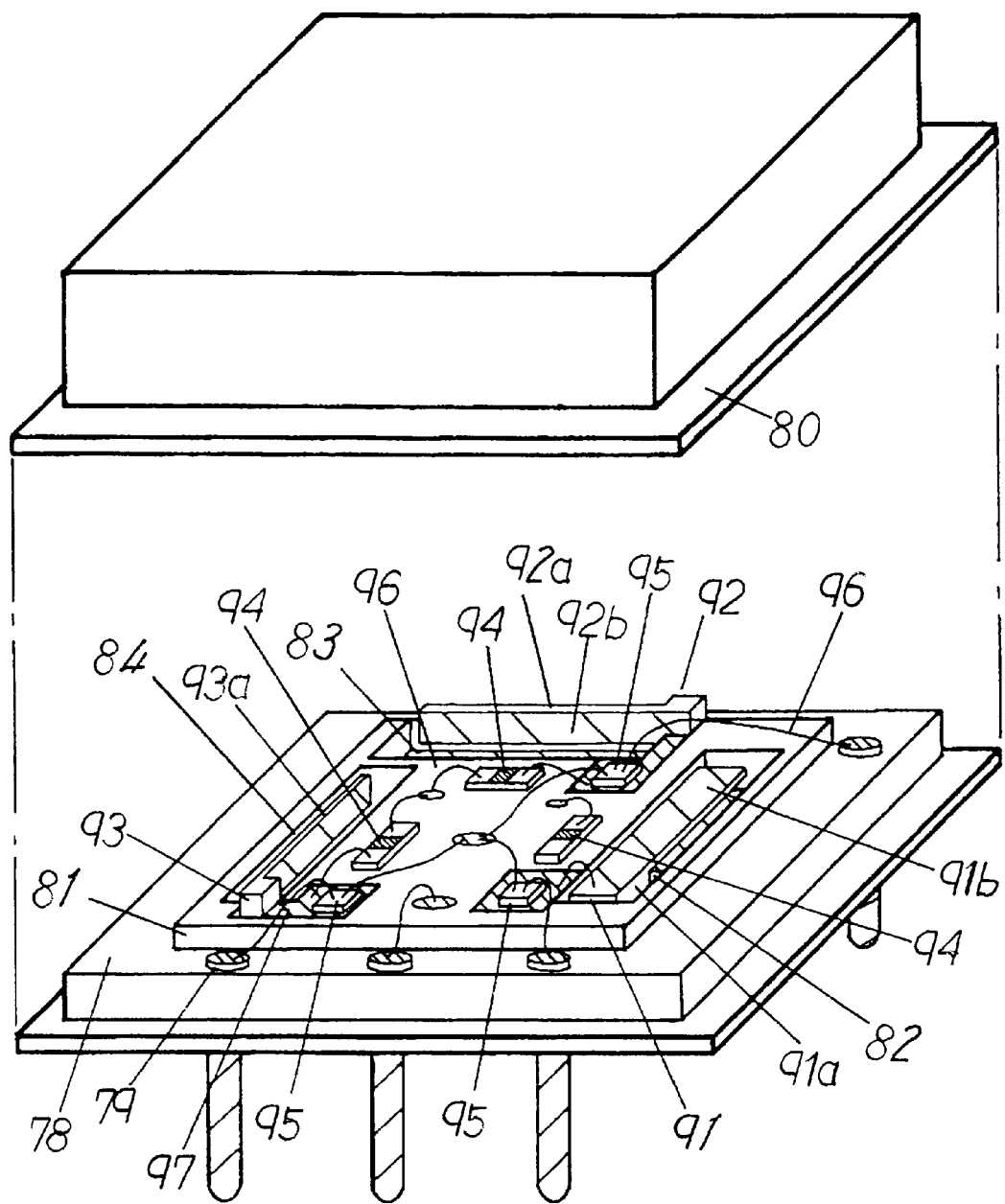
FIG. 8 is an exploded perspective view of an acceleration device in accordance with a fifth exemplary embodiment of the present invention.
Figure 10A:
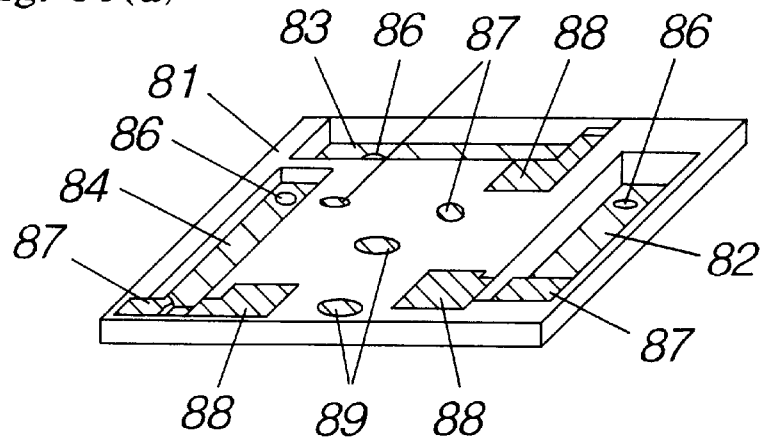
FIG. 10(a) is a perspective view of a substrate used in the acceleration device.
Figure 10B:
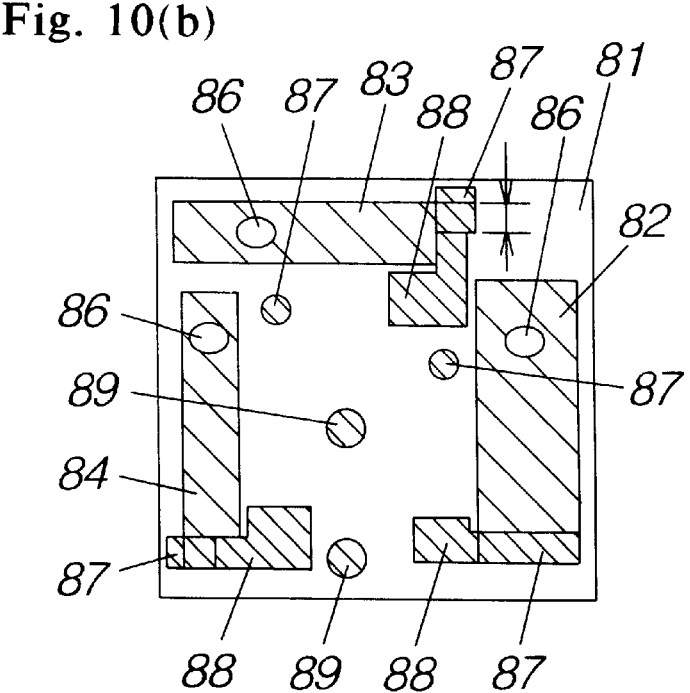
FIG. 10(b) is a plan view of the substrate.
Figure 10C:
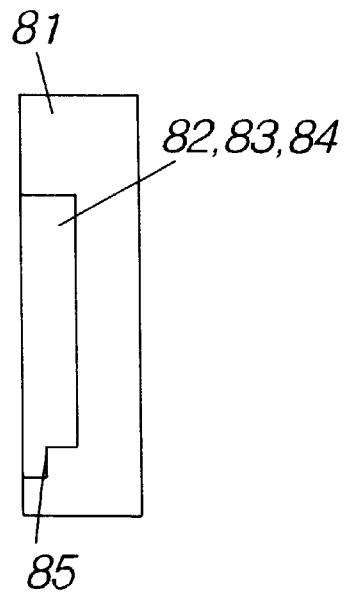
FIG. 10(c) is a cross sectional view of the substrate.

An acceleration device of FIG. 8 is provided with a substrate 81 on the upper surface of the stem 78. Provided in the substrate 81 are a first, a second and a third hollows 82, 83, 84 for disposing a first, a second and a third acceleration sensors 91, 92, 93, respectively, at certain specified places. As shown in FIG. 10, each of the hollows 82, 83, 84 is provided at one end of the inner side-surface with a platform 85, which is for supporting an acceleration sensor at a certain specific place; and a through hole 86 is provided at a place in the bottom eccentric from the central axis and opposite to the platform 85. A ground electrode 87 is provided in the first hollow 82 at a place immediately close to the platform 85, in the second hollow 83 and the third hollow 84 respectively at a place immediately on the platform 85, and in a certain specific place of the substrate 81. A gate electrode 88 is provided on the substrate 81 at a place in the vicinity of the platform 85 of the respective hollows 82, 83, 84. A source electrode 89 is provided on the substrate 81 at a certain specific place. The ground electrode 87, the gate electrode 88 and the source electrode 89 are connected within the substrate 81.

Provided in the first, second and third hollows 82, 83, 84, respectively, are a first, a second and a third acceleration sensors 91, 92, 93, which sensors being similar to those of embodiment 1, with the shape of an approximate letter "L". In the first hollow 82, the first acceleration sensor 91 is disposed so that the external electrode 91b of long arm section 91a is positioned on the same, or approximately the same, level as the upper surface of substrate 81. In the second hollow 83, the second acceleration sensor 92 is disposed with the side surface on the platform 85 of second hollow 83 so that the external electrode 92b of long arm section 92a is extruding out of the upper surface of substrate 81. In the third hollow 84, the third acceleration sensor 93 is disposed with the side surface on the platform 85 of third hollow 84 so that the external electrode 93b (not shown) of long arm section 93a is extruding out of the upper surface of substrate 81. Disposing operation of these acceleration sensors 91, 92, 93 in respective hollows 82, 83, 84 is conducted using a pin or the like tools inserted through the through hole 86 provided in respective hollows. The respective acceleration sensors 91, 92, 93 have been disposed so that their respective directions of the highest detection sensitivity cross at right angles among each other.

Figure 9:
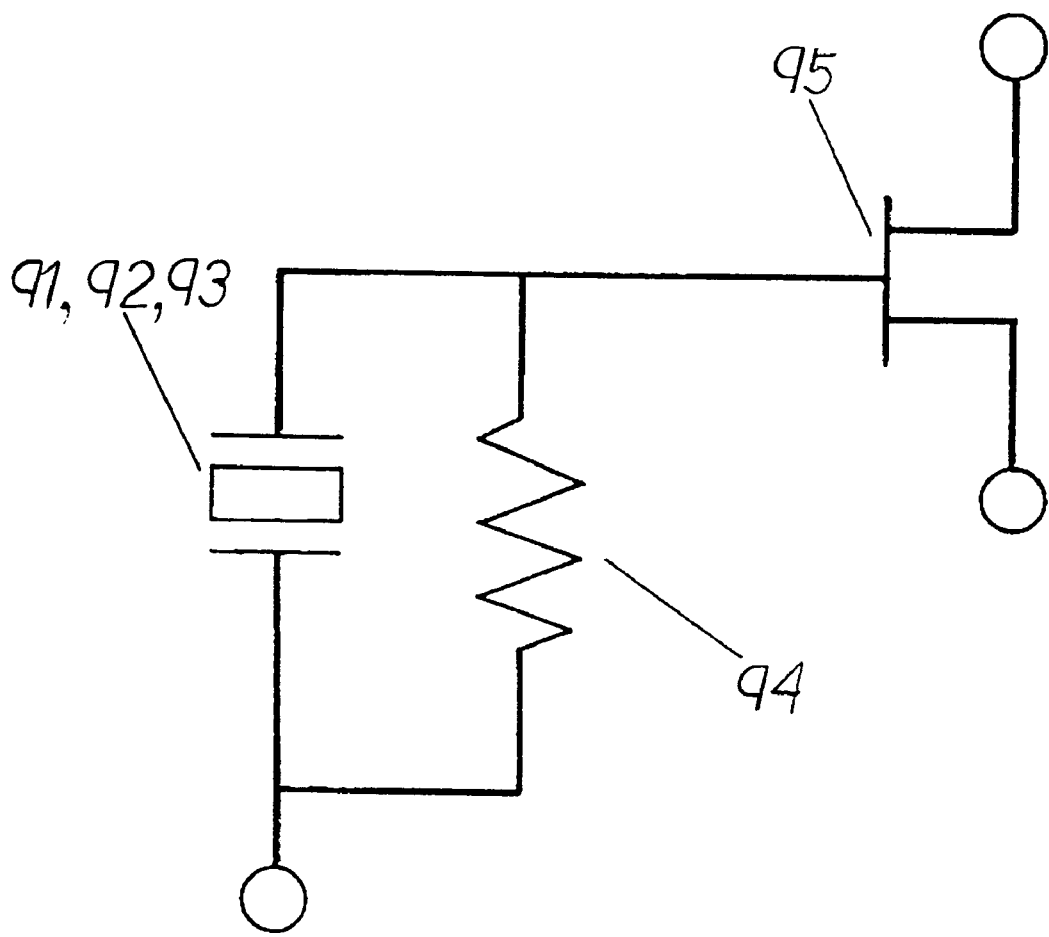
FIG. 9 is a circuit diagram of the acceleration device.

At a certain specific place on the substrate 81, a resistor 94 is provided, and a field effect transistor 95 is provided to be electrically connected with the gate electrode 88. The external electrodes in the long arm section of respective acceleration sensors 91, 92, 93 are connected with the gate electrode 88, the resistor 94, the field effect transistor 95, etc. by means of wire 96 of Au, Al, etc., a solder, or an interconnection layer 97 formed of conductive resin, etc. These members constitute a certain desired source follower circuit, as shown in FIG. 9. The circuit is electrically connected with an outlet electrode 79 of the stem 78. A cap 80 is put on the stem 78 to seal the substrate 81 in.

Providing the hollows 82, 83, 84 in the substrate 81 and disposing the acceleration sensors 91, 92, 93, respectively therein enables detection of a small low frequency acceleration with a high frequency. Providing the through hole 86 in the hollows 82, 83, 84 helps improve the operating efficiency in disposing the acceleration sensors 91, 92, 93 in the hollows.

Figure 11A:
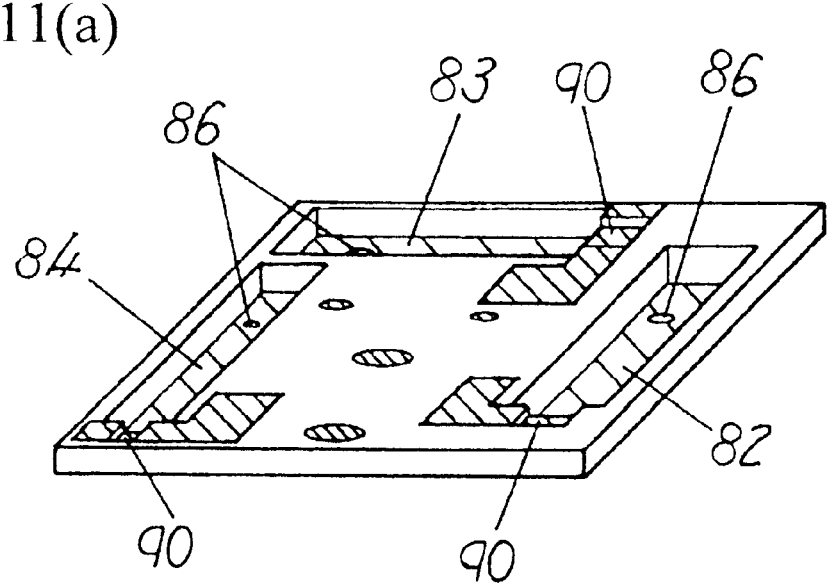
FIG. 11(a) shows perspective view of a modification of the substrate.
Figure 11B:
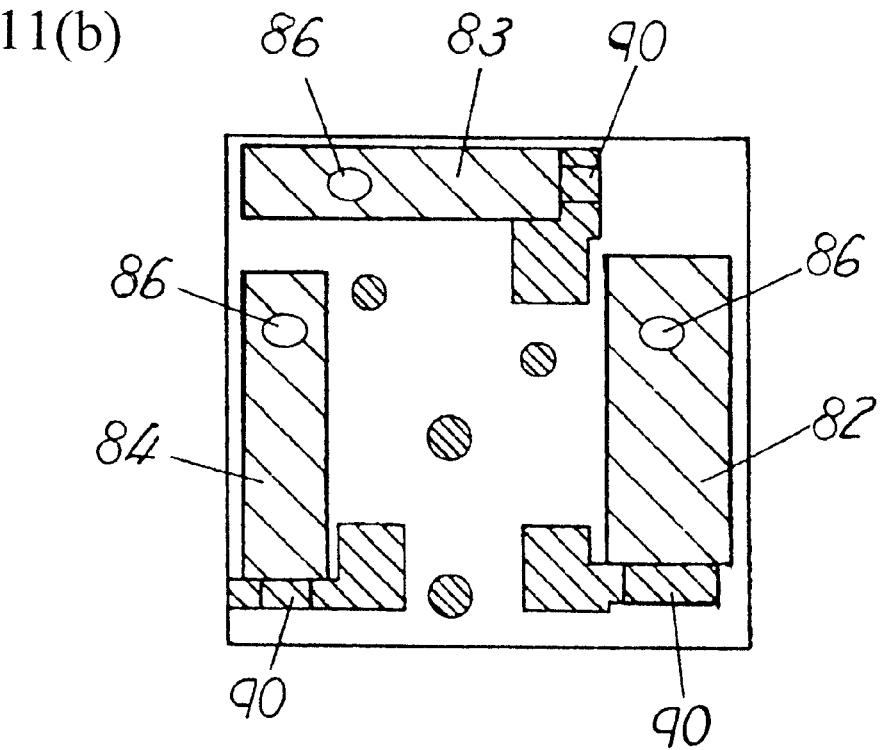
FIG. 11(b) is a plan view of the modified substrate.

As shown in FIG. 11, the first, the second and the third hollows 82, 83, 84, respectively, should preferably be depressions 90 that fit to the shape of respective acceleration sensors (not shown). Under such configurations, the acceleration sensors may be disposed accurately to the respective right places Although the present embodiment has been described based on an assumption that there are three acceleration sensors, the number of acceleration sensors may be two, or not less than four.

EMBODIMENT 6

Figure 12:
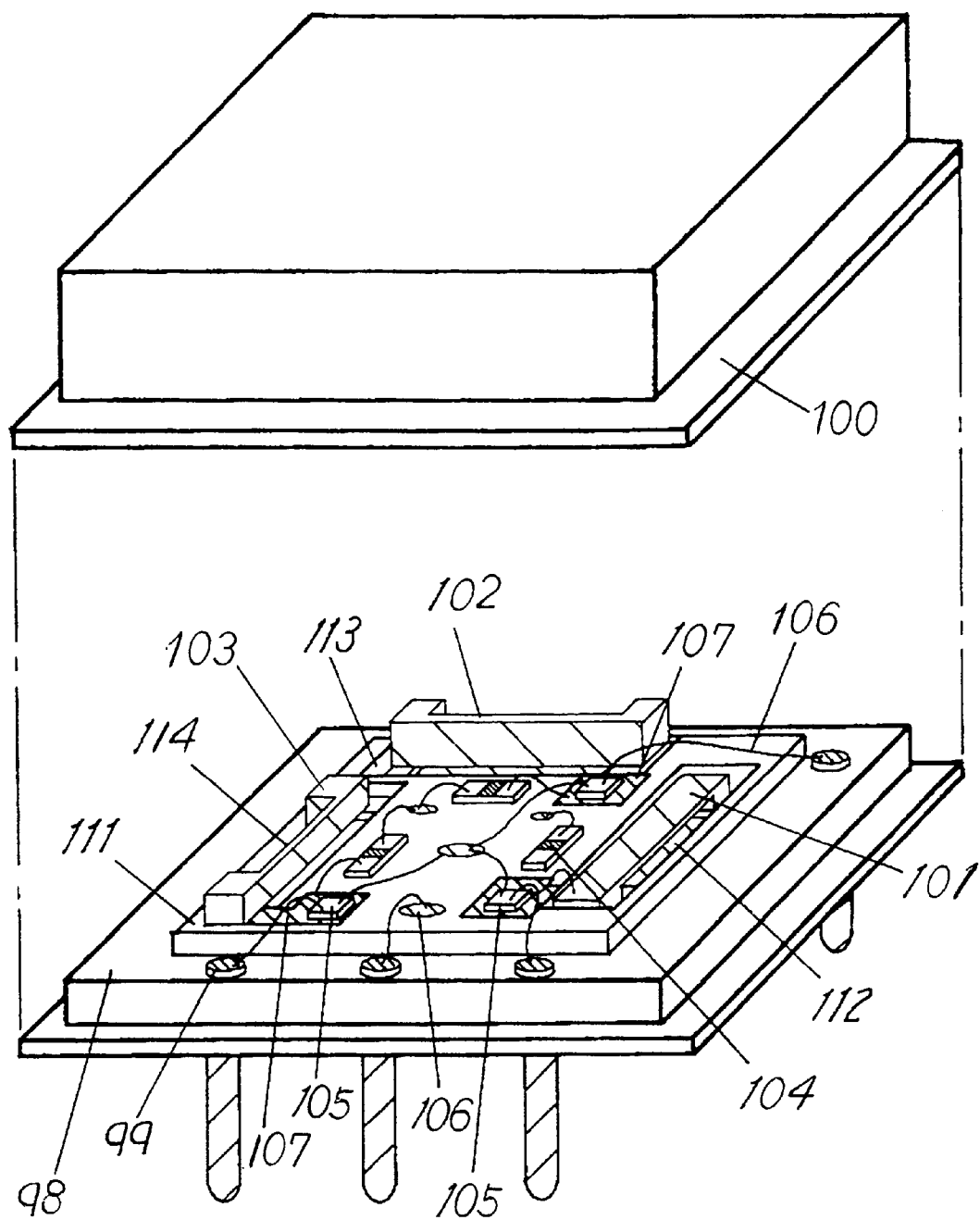
FIG. 12 is an exploded perspective view of an acceleration device in accordance with a sixth exemplary embodiment of the present invention.
Figure 13A:
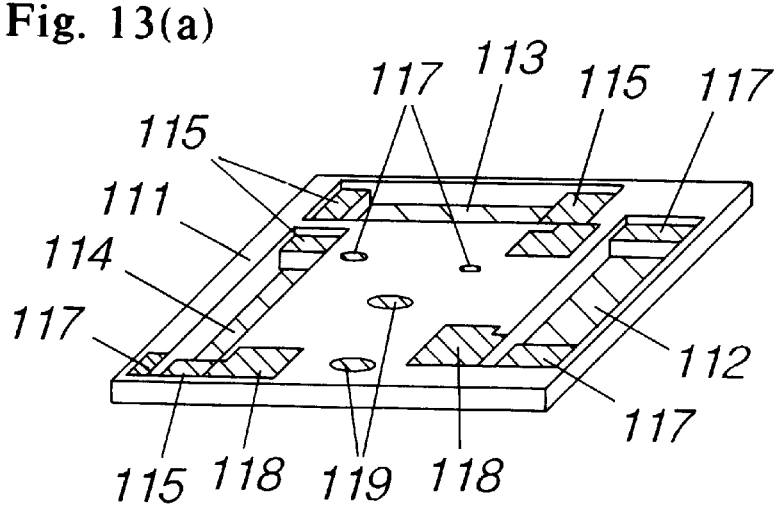
FIG. 13(a) is a perspective view of a substrate used in the acceleration device.
Figure 13B:
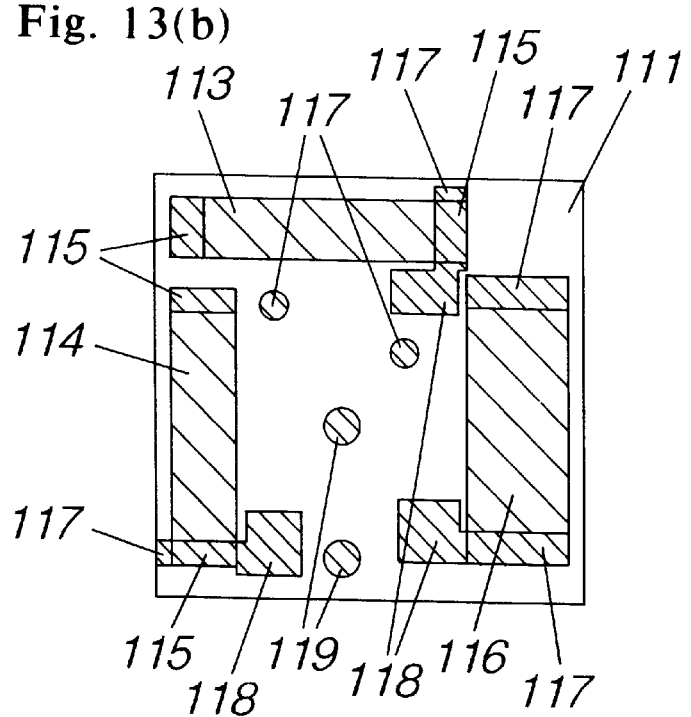
FIG. 13(b) is a plan view of the substrate.
Figure 13C:
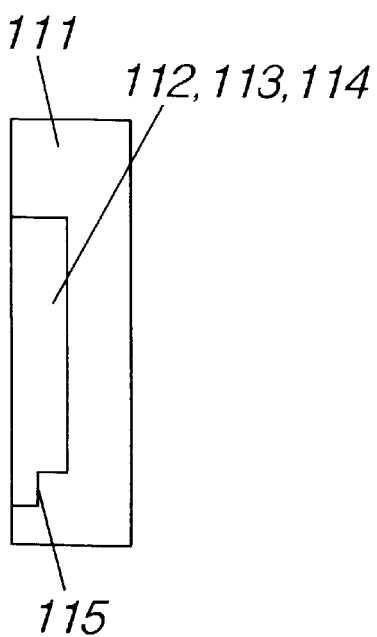
FIG. 13(c) is a cross sectional view of the substrate.

An acceleration device of FIG. 12 is provided on the stem 98 with a substrate 111 on which a plurality of acceleration sensors 121, to be described later, are mounted. Provided on the substrate 111 are a first, a second and a third hollows 112, 113, 114, as shown in FIG. 13, for disposing respective acceleration sensors in certain specific places. Each of the hollows 112, 113, 114 is provided with a pair of platforms 115 on the encountering inner side-surfaces for supporting the respective acceleration sensors at certain specified positions. A ground electrode 117 is provided in the first hollow 112 at the upper surface of platform 115, in the second hollow 113 and the third hollow 114 respectively at a place immediately on the platform 115, and in a certain specific place of the substrate 111. A gate electrode 118 is provided on the substrate 111 at a place in the vicinity of the platform 115 of the respective hollows 112, 113, 114. A source electrode 119 is provided on the substrate 111 at a certain specific place. The ground electrode 117, the gate electrode 118 and the source electrode 119 are connected within the substrate 111.

Figure 14A:
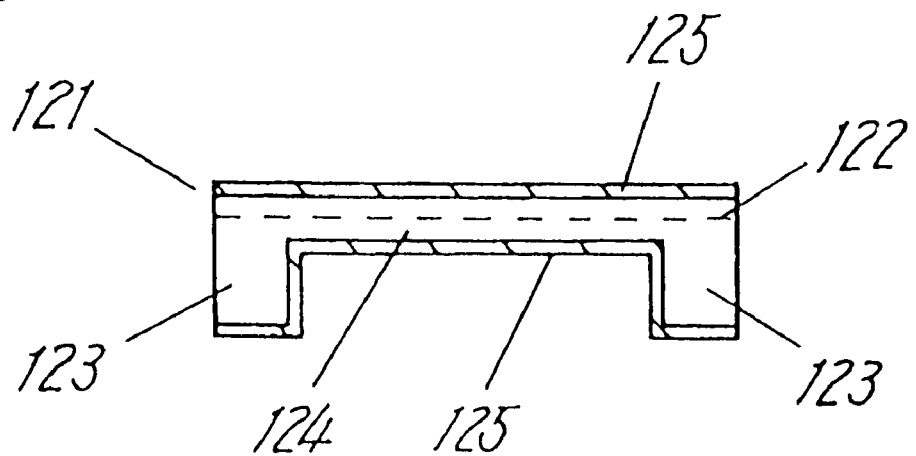
FIG. 14(a) is a cross sectional view of an acceleration sensor used in the acceleration device.
Figure 14B:
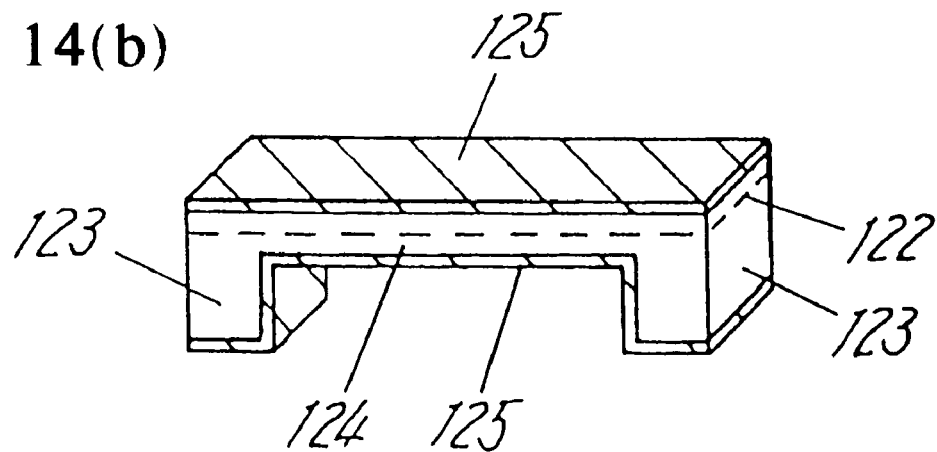
FIG. 14(b) is a perspective view of the acceleration sensor.

Provided in the first, the second and the third hollows 112, 113, 114, respectively, are an acceleration sensor 121 shaped in a modified letter "U", as illustrated in FIG. 14. The acceleration sensor 121 has been formed of piezoelectric plates of single crystal $LiNbO_3$, $LiTaO_3$, etc. bonded together by direct bonding, with respective polarization axes reversed to each other at the polarization phase reversing boundary 122. After the bonding, a surface is partially ground off in the length direction so that the supporting sections 123 are formed in the direction of height, while the long arm section 124 is formed along the direction of length. An external electrode 125 is provided on the upper and the lower surfaces in terms of height direction. Thus the direction of the highest detection sensitivity is made to coincide with the direction of height.

In the first hollow 112, the first acceleration sensor 101 is disposed so that the external electrode of long arm section is positioned on the same, or approximately the same, level as the upper surface of substrate 111. In the second hollow 113, the second acceleration sensor 102 is disposed with the side surface on the platform 115 of second hollow 113 so that the external electrode of long arm section is extruding out of the upper surface of substrate 111. In the third hollow 114, the third acceleration sensor 103 is disposed with the side surface on the platform 115 of third hollow 114 so that the external electrode of long arm section is extruding out of the upper surface of substrate 111. The, first, the second hand the third acceleration sensors 101, 102, 103 have been disposed so that their respective directions of the highest detection sensitivity cross at right angles among each other.

At a certain specific place on the substrate 111, a resistor 104 is provided, and a field effect transistor 105 is provided to be electrically connected with the gate electrode 118. The external electrodes in the long arm direction of respective acceleration sensors 101, 102, 103 are connected with the gate electrode 118, the resistor 104, the field effect transistor 105, etc. by means of wire 106 of Au, Al, etc., a solder, or an interconnection layer 107 formed of conductive resin, etc. These members constitute a certain desired source follower circuit, as shown in FIG. 9. The circuit is electrically connected with an outlet electrode 99 of the stem 98. A cap 100 is put on the stem 98 to seal the substrate 111 in.

An acceleration device incorporating the acceleration sensor of modified "U" shape can detect a small low frequency acceleration with a high accuracy.

EMBODIMENT 7

Figure 15:
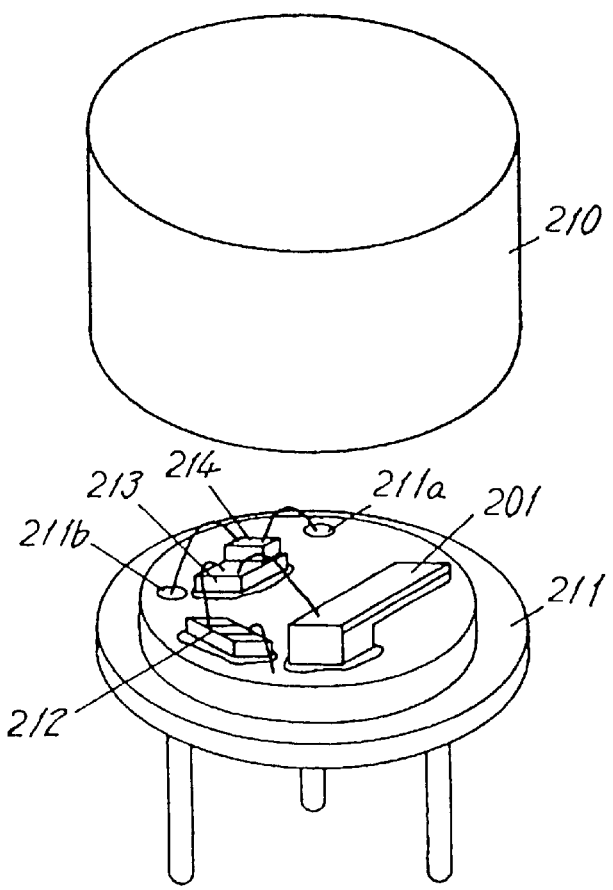
FIG. 15 is an exploded perspective view of an acceleration device in accordance with a seventh exemplary embodiment of the present invention.
Figure 16:
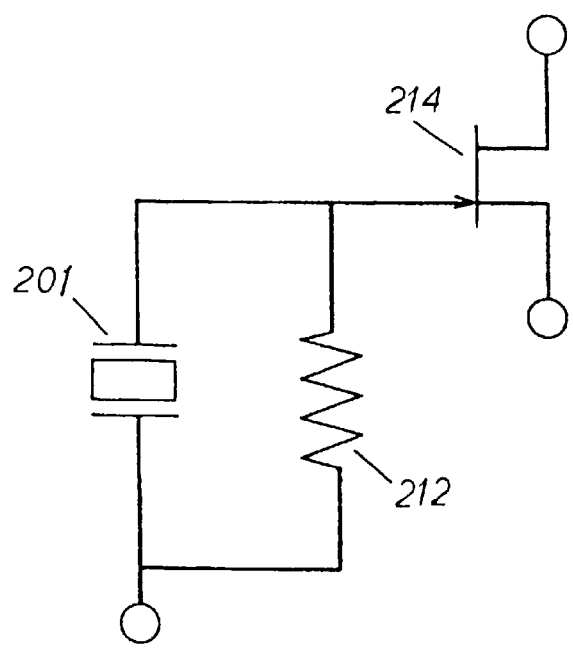
FIG. 16 is a circuit diagram of source follower circuit in the acceleration device.
Figure 17:
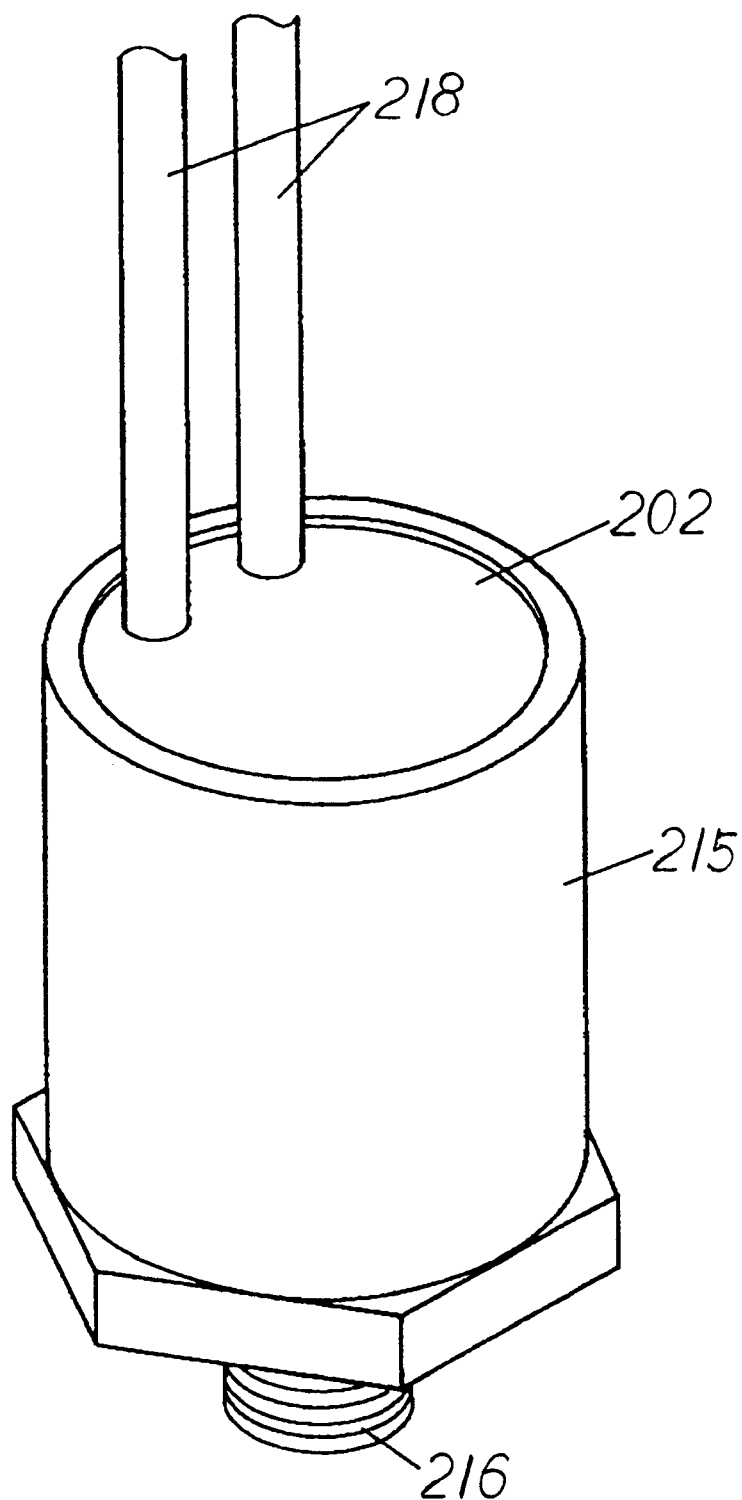
FIG. 17 shows appearance of a cask of acceleration detection device in which the acceleration device is encapsulated.
Figure 18:
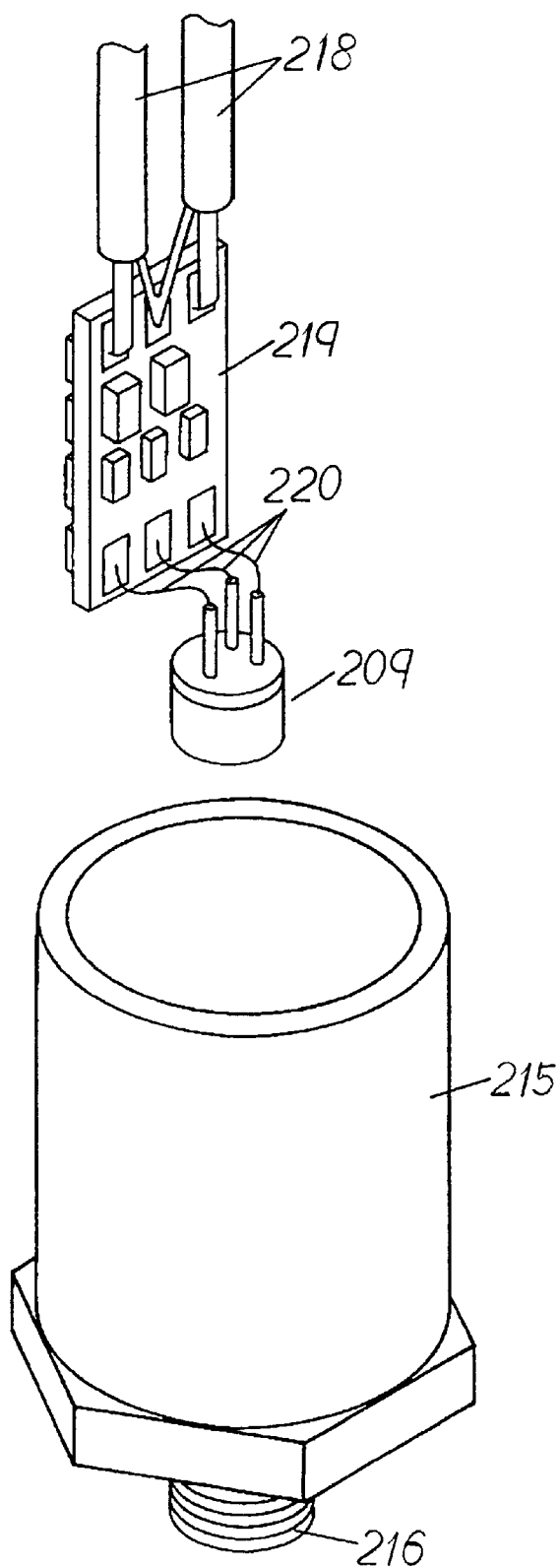
FIG. 18 shows an exploded perspective view of the acceleration detection device.
Figure 19:
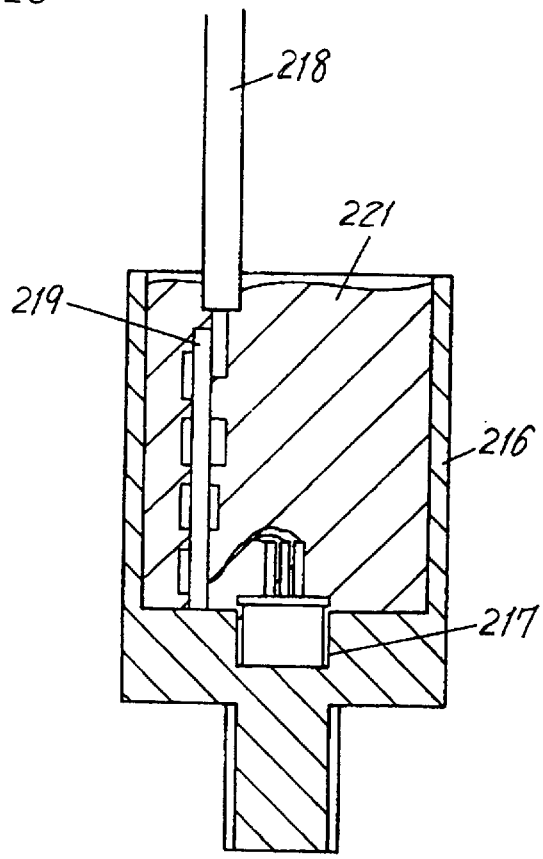
FIG. 19 is a cross sectional view of the acceleration detection device.
Figure 20:
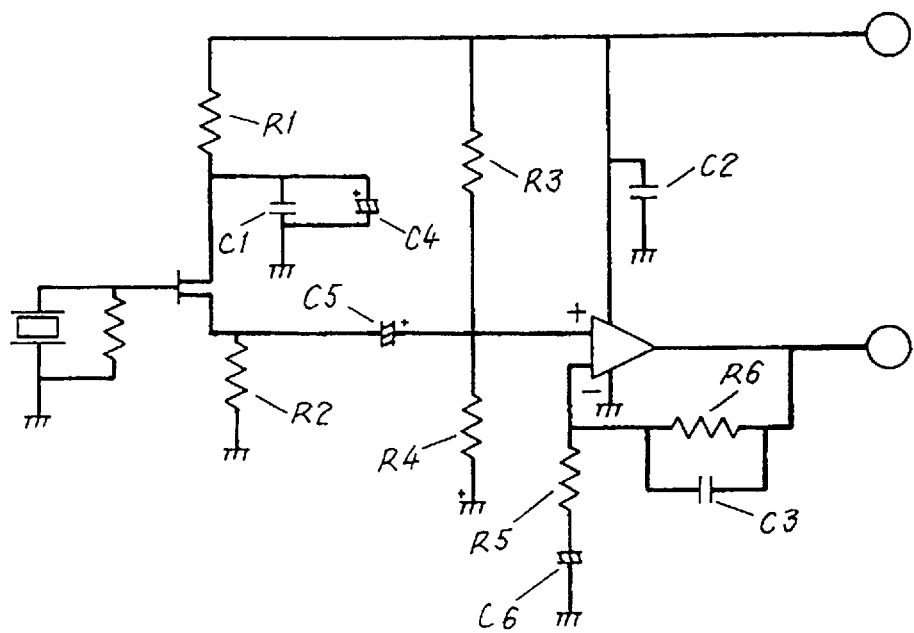
FIG. 20 is a circuit diagram of the acceleration detection device.

An acceleration device of FIG. 15 incorporates an acceleration sensor 201 of biomorph cell, or the same acceleration sensor as that of embodiment 1. Provided on a stem 211 are the acceleration sensor 201, a resistor 212 having an external electrode at both ends of the upper surface, and a base 213 with a conductive body covering the one surface. A bare-chip type field effect transistor 214 is mounted on the base 213, with the gate electrode of transistor 214 and the conductive body of base 213 glued together by a conductive adhesive. The base 213 and the resistor 212 are electrically connected by wire bonding, as are the base 213 and the external electrode of acceleration sensor 201, and the resistor 212 and the stem 111. Further, the drain electrode of transistor 214 and the connection terminal 211a of stem 211 are wire bonded, as are the source electrode of transistor 214 and the connection terminal 211b of stem 211. A cap 210 of cylindrical shape is resistor-welded on the stem 211. In order to lower the output impedance of acceleration sensor 201, a source follower circuit is formed of the field effect transistor 214 and the resistor 212, as shown in FIG. 16. In an acceleration device of the above described structure, the upper limit of detectable frequency is high, and the detection sensitivity is high.

Next, an acceleration detection device which has been structured of the above described acceleration device and an amplifying circuit, etc. is described referring to FIG. 17 through FIG. 20. An acceleration device 209 is dropped with its cap 210 down into a pit 217 of cylindrical shape, which pit has been provided in the cask 215 coaxially to a mounting screw bolt 216 of the cask 215; the entire outer surface of the cap 210 is fixed to the pit 217 with an adhesive or like means. The pit 217 has a diameter slightly greater that the outer diameter the cap 210, and a depth identical to that of the cap 210, so that the cap 210 is placed well therein. The acceleration device 209 has been connected with an amplifying circuit by means of a soft wire 220, and the amplifying circuit has been connected with a cable 218 for taking signals out. Cask 215 is filled with a resin 202 to cover the acceleration device 209, the wire 220, the amplifying circuit 219 and the end part of the cable 218.

In the present acceleration detection device, because the acceleration device 209 has been disposed on the axial line of the screw bolt 216 of cask 215 and it is housed in the pit 217 that has approximately the same shape as the cap 210, an acceleration to be detected is transmitted to the acceleration sensor most efficiently.

Because the acceleration device 209 has been connected with the amplifying circuit 219 by means of soft wire 220, resonance of the amplifying circuit 219 is hardly transmitted to the acceleration device 209. Therefore, the acceleration device is hardly affected by the resonance.

Furthermore, as the amplifying circuit 219 and other members have been fixed with resin 202 in the cask 215, they are protected against breakage due to vibration, and the reliability is improved.

EMBODIMENT 8

Figure 21:
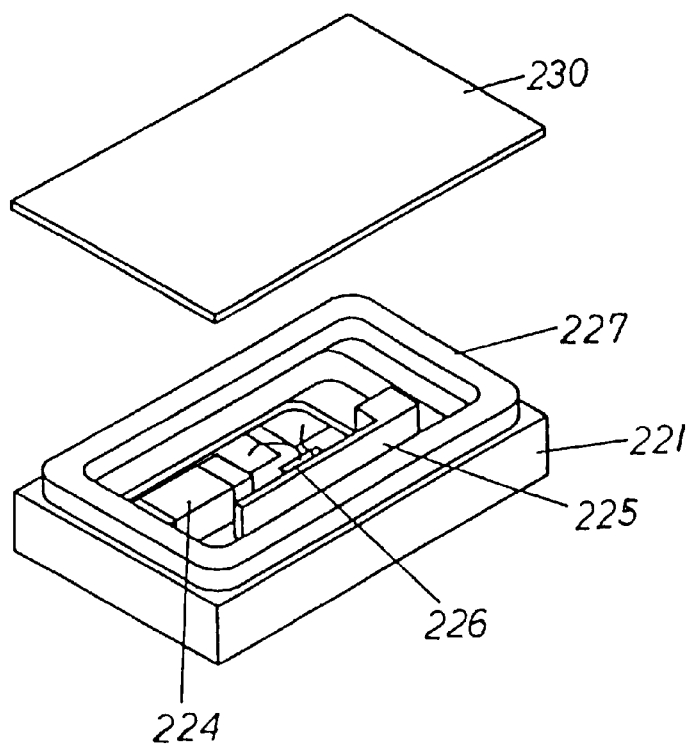
FIG. 21 is a perspective view of an acceleration device in accordance with an eighth exemplary embodiment of the present invention.
Figure 22:
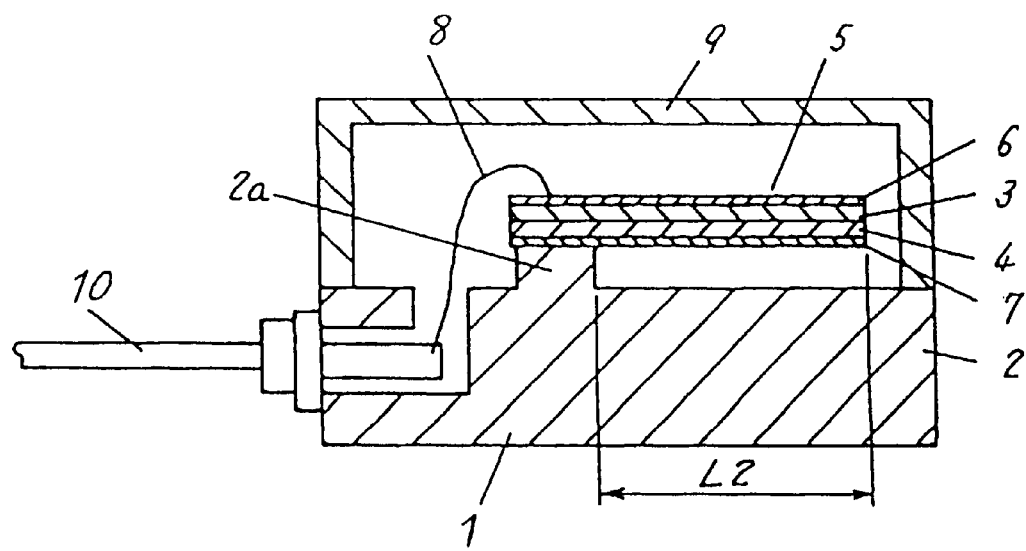
FIG. 22 is a cross sectional view of a conventional acceleration device.

In an acceleration device of FIG. 21, a first and a second circuit patterns (not shown) and a resistor 224 of rectangular chip type, etc. having an interposing resin layer are disposed on the bottom of a bottomed cylindrical metal case 221. On the upper surface of first circuit pattern, an acceleration sensor 225 shaped in an approximate letter "L", which being similar to that of embodiment 1, is mounted with a conductive resin layer interposed. On the upper surface of second circuit pattern, a transistor 226 of field effect type, etc. is mounted with a conductive resin layer interposed. The resistor 224, the transistor 226 and the acceleration sensor are electrically connected to form a source follower circuit, and the source follower circuit is connected to connection terminals. The open end of case 221 is covered by a cap 230 of flat plate shape via a metal ring 227 provided around the top outer circumference of the case.

With the above described structure, an acceleration device that is capable of detecting a low frequency acceleration can be fabricated in smaller dimensions.

INDUSTRIAL APPLICABILITY

An acceleration sensor and an acceleration device in accordance with the present device exhibit smaller variances in detection characteristics as compared with conventional counterparts, and are capable of detecting low frequency acceleration with a high detection accuracy. It seems that these advantages will make a material contribution in various application fields.

What is claimed is:

1. An acceleration sensor comprising:

a first pizoelectric plate;

a second pizeoelectric plate in contact with the first pizoelectric plate and having a polarization axis reversed to, or in parallel with, a polarization axis of the first pizoelectric plate, wherein at least one end in a length direction is thicker than an opposite end;

a first external electrode provided on a main surface of the first piezoelectric plate, said main surface being opposite to a surface in contact with the second piezoelectric plate, wherein the first external electrode is provided with a notch; and a second external electrode provided on a main surface of the second piezoelectric plate, said main surface being opposite to a surface in contact with the first pizoelectric plate.

2. The acceleration sensor claim 1, wherein a cross sectional shape of the second piezoelectric plate along a plane parallel to the length direction is a substantially "L" shape.

3. The acceleration sensor of claim 1, wherein the first piezoelectric plate and the second piezoelectric plate are bonded together by direct bonding.

4. The acceleration sensor of claim 1, wherein said at least one end is at least four times thicker than said opposite end.

\* \* \* \* \*